United States Patent Office 2,816,927
Patented Dec. 17, 1957

2,816,927

BIS(1-NITROCYCLOALKYLMETHYL) AMINES

Robert Arthur Smiley, Woodbury, N. J., assignor to E. I. du Pont de Nemours and Company, Wilmington, Del., a corporation of Delaware No Drawing. Application October 13, 1955,
Serial No. 540,343

5 Claims. (Cl. 260—563)

The present invention relates to novel nitro compounds and their preparation. More particularly, the present invention relates to novel dinitro compounds, bis(1-nitrocycloalkylmethyl) amines, and a method of preparing the same.

In general, nitro compounds have found widespread application because of the ease with which they are reduced to amines, which are useful in the production of dyes and emulsifiers. In particular, the subject compounds are of value because of the ease with which they are hydrogenated to triamines excellent as epoxy-resin curing agents; the details on the method of preparation of these curing agents can be found in my copending application Serial No. 540,344, filed October 13, 1955.

Accordingly, an object of the present invention is to provide valuable new nitro compounds. Another object of the present invention is to provide valuable new nitro compounds by an economically feasible process. A still further object of the present invention is to provide valuable new nitro compounds which are readily hydrogenated to form superior epoxy-resin curing agents. Other objects will become apparent as the invention is further described.

I have found that the foregoing objects may be achieved when I mix together a nitro cycloalkane, formaldehyde, and ammonia.

In accordance with the process of the present invention, the nitro cycloalkane, formaldehyde, and ammonia are mixed together at a temperature within the range of the freezing point of the mixture and the reflux temperature of the mixture.

The following examples serve to illustrate specific embodiments of the method of carrying out the process of the present invention. However, they will be understood to be illustrative only and not to limit the invention in any manner. The parts in the examples are parts by weight unless otherwise designated.

Example 1

One hundred and eighty parts of a 36% aqueous solution of formaldehyde was added dropwise over a period of one hour to a mixture of 258 parts of nitrocyclohexane, 270 parts of concentrated ammonium hydroxide (28% ammonia), and 410 parts of 95% ethanol, while the mixture was heated on a steam bath and stirred. When the addition of the formaldehyde was complete, the reaction mixture was refluxed for an additional four hours and then allowed to cool to room temperature. The mixture was poured into 1090 parts of a 1/1 solution of concentrated hydrochloric acid (36% hydrochloric acid) and water. The hydrochloride salt which precipitated was removed by filtration, washed in ethanol, and dried. A yield of 234 parts (70%) of bis(1-nitrocyclohexylmethyl)amine hydrochloride was obtained. The hydrochoride was neutralized with aqueous sodium hydroxide to free the amine. After recrystallization of the amine from 95% ethanol, a yield of 176 parts (84%) of white crystalline bis(1-nitrocyclohexylmethyl)amine, melting point 57–58° C., was obtained.

Example 2

Nitrocyclohexane in the amount of 258 parts and 180 parts of 36% aqueous formaldehyde solution were dissolved in 400 parts of absolute ethanol. Ammonia gas was bubbled through the solution for an hour, while the solution was stirred. Then, the flow of ammonia was stopped, and the solution was refluxed on a steam bath for three hours. At the end of this time, the hot solution was acidified with concentrated hydrochloric acid and then allowed to stand under refrigeration for about sixteen hours. The precipitated bis(1-nitrocyclohexylmethyl)amine hydrochloride was filtered off, washed with ethanol, and dried. One-hundred parts (30% conversion and 85% yield) of the hydrochloride salt was obtained. Unreacted nitrocyclohexane in the amount of 168 parts was recovered by evaporation of the ethanol from the filtrate.

The hydrochloride was neutralized with ammonium hydroxide, and 79 parts (92%) of bis(1-nitrocyclohexylmethyl)amine was obtained and recrystallized from 95% ethanol.

Example 3

Three-hundred parts of concentrated ammonium hydroxide, 258 parts of nitrocyclohexane, and 180 parts of a 36% aqueous solution of formaldehyde were added to 385 parts of methanol in an autoclave. The mixture was stirred for 3 hours at 100° C. and under an autogenous pressure of 80 p. s. i. Then, the mixture was cooled. After cooling, two layers formed in the mixture. The aqueous layer was separated from the oily layer, which was steam distilled. The residue was dissolved in hot methanol, and upon cooling 235 parts (90% yield) of bis(1-nitrocyclohexylmethyl)amine crystallized from the solution and was separated by filtration. From the distillate was recovered 32 parts of unreacted nitrocyclohexane.

The bis(1-nitrocyclohexylmethyl)amine was characterized by elemental analysis of its hydrochloride salt.

*Analysis.*—Found: C, 50.43, 50.24; H, 7.69, 7.66; N, 12.54, 12.58. Calcd. for $C_{14}H_{25}N_3O_4 \cdot HCl$: C, 50.07; H, 7.74; N, 12.51.

The reaction of the nitro cycloalkane, formaldehyde, and ammonia preferably may be carried out at a temperature within the range of 20° C. and the reflux temperature of the mixture. The use of lower temperatures requires external cooling and longer reaction times. As illustrated by Example 3, the use of pressure permits the use of higher temperatures and subsequently a quickening of the reaction.

The presence of a solvent is not critical to the carrying out of the process of the present invention. However, the presence of a mutual solvent for all the reactants facilitates agitation and thus provides for better distribution of the reactants within the solution. Alkanols containing 1 to 3 carbon atoms, e. g., methanol, ethanol, or isopropanol, are the preferred solvents.

As illustrated by the examples, the ammonia may be introduced into the reaction mixture either as ammonia gas or as an aqueous ammonium hydroxide solution. The nitro cycloalkane, formaldehyde and ammonia may be present in substantially stoichiometric amounts. However, the use of more than a stoichiometric amount of the formaldehyde and/or the ammonia is not deleterious to the yields of the dinitro compounds obtained according to the process of the present invention.

Examples 1 and 3 describe means for separating the dinitro compounds produced by the process of the present invention. For example, after completion of the reaction, hydrochloric acid is added to the reaction mixture to precipitate the dinitro amino compounds as their hydrochloride salts. Alternatively, stratification and steam distillation may be used. Solid dinitro compounds may be purified further by recrystallization from a suitable solvent, e. g., ethanol.

Although the process of the present invention has been illustrated by the production of novel dinitro compounds from nitrocyclohexane, the use of other nitro cycloalkanes is equally feasible. For example, nitrocycloheptane or nitrocyclopentane may be substituted for the nitrocyclohexane.

Although the preceding examples illustrate the process as a batchwise process, the process of the present invention also may be carried out in a continuous manner. For example, the nitro cycloalkane, formaldehyde, and ammonia can be added to the reaction zone continuously in a manner such that at least substantially stoichiometric amounts of the nitro cycloalkane, formaldehyde, and ammonia are maintained in said zone, while the reaction product is continuously removed from said zone.

The invention has been described in detail in the foregoing. It will be apparent to those skilled in the art that many variations are possible without departure from the scope of the invention. I intend, therefore, to be limited only by the following claims.

I claim:
1. Bis(1-nitrocycloalkylmethyl) amines.
2. A process for the preparation of bis(1-nitrocycloalkylmethyl) amines which comprises mixing at least stoichiometric amounts of a nitro cycloalkane, formaldehyde, and ammonia at a temperature within the range of 20° C. and the reflux temperature of the mixture.
3. A process for the preparation of bis(1-nitrocycloalkylmethyl) amines which comprises mixing at least stoichiometric amounts of a nitro cycloalkane, formaldehyde, and ammonia in an aqueous solution of a 1–3 carbon alkanol at a temperature within the range of 20° C. and the reflux temperature of the mixture.
4. Bis(1-nitrocyclohexylmethyl)amine.
5. A process for the preparation of bis(1-nitrocyclohexylmethyl)amine which comprises mixing at least stoichiometric amounts of nitrocyclohexane, formaldehyde, and ammonia in an aqueous solution of a 1–3 carbon alkanol at a temperature within the range of 20° C. and the reflux temperature of the mixture, and thereafter recovering said dinitro compound.

References Cited in the file of this patent

UNITED STATES PATENTS

| | | |
|---|---|---|
| 2,627,491 | Szabo et al. | Feb. 3, 1953 |
| 2,739,981 | Szabo et al. | Mar. 27, 1956 |